US010272356B2

(12) United States Patent
Fischer et al.

(10) Patent No.: US 10,272,356 B2
(45) Date of Patent: Apr. 30, 2019

(54) AIR STRIPPER SYSTEM AND METHOD (71) Applicant: Q.E.D. Environmental Systems, Inc., Dexter, MI (US)

(72) Inventors: David A. Fischer, Ann Arbor, MI (US); Bryan D. Spicer, Monroe, MI (US)

(73) Assignee: Q.E.D. Environmental Systems, Inc., Dexter, MI (US)

( * ) Notice: Subject to any disclaimer, the term of this patent is extended or adjusted under 35 U.S.C. 154(b) by 293 days.

(21) Appl. No.: 15/443,129

(22) Filed: Feb. 27, 2017

(65) Prior Publication Data

US 2017/0304743 A1 Oct. 26, 2017

Related U.S. Application Data (60) Provisional application No. 62/325,155, filed on Apr. 20, 2016.

(51) Int. Cl.
| | | |
|---|---|---|
| *B01D 19/00* | (2006.01) | |
| *B01D 3/32* | (2006.01) | |
| *C02F 1/20* | (2006.01) | |
| *B01D 3/22* | (2006.01) | |
| *B01D 3/34* | (2006.01) | |
| *C02F 101/32* | (2006.01) | |
| *C02F 103/06* | (2006.01) | |

(52) U.S. Cl.
CPC .............. *B01D 3/324* (2013.01); *B01D 3/22* (2013.01); *B01D 3/346* (2013.01); *B01D 19/0005* (2013.01); *B01D 19/0015* (2013.01); *C02F 1/20* (2013.01); *C02F 2101/32* (2013.01); *C02F 2103/06* (2013.01)

(58) Field of Classification Search
CPC .. C02F 1/20; C02F 2101/322; C02F 2103/06; C02F 1/006; C02F 2101/32; B01D 19/0015; B01D 3/22; B01D 3/324; B01D 3/20; B01D 19/0005; B01D 3/16; B01D 3/008; B01D 3/163; B01D 3/346; B01D 53/18; B01J 19/32; B01J 2219/3221; B01J 2219/3222; B01J 2219/32227; B01J 2219/32255; B01J 2219/32408
See application file for complete search history.

(56) References Cited

U.S. PATENT DOCUMENTS

| | | |
|---|---|---|
| 4,174,363 A | 11/1979 | Bruckert |
| 5,240,595 A | 8/1993 | Lamarre |
| 5,378,267 A | 1/1995 | Bros et al. |
| (Continued) | | |

FOREIGN PATENT DOCUMENTS

| | | |
|---|---|---|
| WO | 02100505 A2 | 12/2002 |

OTHER PUBLICATIONS

Extended European Search Report and European Search Opinion for corresponding European Patent Application No. 171666282 dated Aug. 16, 2017, 8 pages.

*Primary Examiner* — Sharon Pregler (74) *Attorney, Agent, or Firm* — Harness, Dickey & Pierce, P.L.C.

(57) ABSTRACT

An air stripper apparatus is disclosed which incorporates a plurality of trays that are removably supported within a cabinet. A plurality of downcomers are also fixedly disposed within the cabinet, rather than on the trays. Removing the downcomer from each tray enables a simpler, lighter and easier to clean tray to be constructed.

7 Claims, 9 Drawing Sheets

(56) References Cited

U.S. PATENT DOCUMENTS

| | | | | |
|---|---|---|---|---|
| 5,478,507 A | * | 12/1995 | Bros | B01D 3/163 |
| | | | | 261/114.1 |
| 5,518,668 A | | 5/1996 | Chresand et al. | |
| 8,523,152 B2 | * | 9/2013 | Spicer | B01D 3/324 |
| | | | | 261/113 |
| 8,678,353 B2 | * | 3/2014 | Spicer | B01D 3/008 |
| | | | | 261/110 |

* cited by examiner

SECTION A-A

AIR STRIPPER SYSTEM AND METHOD

CROSS-REFERENCE TO RELATED APPLICATIONS

This application claims the benefit of U.S. Provisional Application No. 62/325,155, filed on Apr. 20, 2016. The entire disclosure of the above application is incorporated herein by reference.

FIELD

The present disclosure relates to air stripper systems and methods for removing volatile organic compounds from liquids such as water, and more particularly to an air stripper apparatus and method which includes a construction which makes for easier removal and maintenance of various portions of the apparatus.

BACKGROUND

The statements in this section merely provide background information related to the present disclosure and may not constitute prior art.

This section provides background information related to the present disclosure which is not necessarily prior art.

Groundwater and waste streams can be contaminated with contaminants such as volatile organic compounds (VOCs), or dissolved gases, such as Radon, CO2, CH4, H2S, etc.) which require removal in order to reuse or discharge the water. For the purpose of the following discussion, it will be understood that reference to the term "VOCs" includes any combination of VOCs and/or the above mentioned dissolved gasses. Air strippers which direct streams of air into a flowing stream of the contaminated water are used to transfer the VOCs from the water (aqueous phase) to the air stream (gaseous phase), which permits removal of the VOCs. Known air strippers include tower designs and stacked tray designs.

Chemical changes during the air to water contact often results in mineral deposits, biologic fouling, and other precipitant deposits occurring at internal process unit surfaces. Cleaning known air stripper designs is cumbersome and time consuming due to the necessary disassembly required and the size/weight of the components that must be removed to access the fouled components.

Present day tray air strippers make use of a plurality of horizontally arranged trays stacked in spaced apart relationship one on top of the other. One example of a present day air stripper apparatus is disclosed in U.S. Pat. No. 8,523,152 to Spicer, issued Sep. 3, 2013, assigned to the assignee of the present application, the entire disclosure of which is hereby incorporated by reference into the present application. Each tray includes a downcomer portion through which a fluid flows from the tray positioned immediately above it. Downcomers also effect air sealing to prevent high volumes of air from passing up through the water drain channel formed by the downcomer.

Forming each tray with its own downcomer attached thereto, while highly effective for the removal of volatile organic compounds from the fluid, nevertheless creates a more complex tray design. The use of additional gaskets is also required to ensure that the proper sealing occurs around the upper end of the downcomer when the tray is slidably inserted into a housing of the air stripper. The presence of the downcomer as a permanent portion of the tray also increases the cost of manufacture of the tray and, in some instances, may necessitate additional care and effort in cleaning and handling the tray during cleaning, as well as additional space in storing spare trays.

SUMMARY

This section provides a general summary of the disclosure, and is not a comprehensive disclosure of its full scope or all of its features.

In one aspect the present disclosure relates to an air stripper apparatus for removing contaminants from a contaminant-entrained fluid. The apparatus may comprise a cabinet having a fluid inlet port for admitting the—contaminant-entrained fluid, a clean fluid discharge port adjacent a lower area of the cabinet, and a contaminant-entrained air discharge port adjacent an upper end of the cabinet. At least one tray may be removably supported within the cabinet in a non-vertical orientation. The tray may have a plurality of perforations for allowing air to be blown in an upwardly direction through the tray. A downcomer may be disposed within the cabinet adjacent a floor section for helping to control a flow of the contaminant-entrained fluid through the cabinet.

In another aspect the present disclosure relates to an air stripper apparatus having a cabinet with a fluid inlet port for admitting a contaminant-entrained fluid, a clean fluid discharge port adjacent a lower area of the cabinet, and a contaminant-entrained air discharge port adjacent an upper end of the cabinet. A central vertical wall may be provided which divides the cabinet into two vertically arranged, side by side sections. A plurality of trays may be arranged vertically within the cabinet in the side by side sections so as to be staggered vertically from one another. Each tray may be slidably supported within the cabinet in a horizontal orientation and removable from the cabinet. A plurality of weirs may be included. Each weir may be disposed adjacent an associated one of the trays. A plurality of horizontally disposed floor sections may also be included, with each one of the floor sections being disposed adjacent a respective one of the weirs. Each tray may have a plurality of perforations for allowing air to be blown in an upwardly direction through the tray, while enabling the contaminant-entrained fluid entering from the fluid inlet port to collect on each tray. A plurality of downcomers may be disposed within the cabinet, with each downcomer being disposed adjacent an associated one of the horizontal floor sections and adjacent a respective one of the weirs. The downcomers may help to control a flow of the contaminant-entrained fluid through the cabinet.

In still another aspect the present disclosure relates to a method for performing an air stripping operation to remove contaminants from a contaminant-entrained fluid. The method may comprise using a cabinet to receive a contaminant-entrained fluid at an upper end thereof. The method may further comprise flowing the contaminant-entrained fluid through a plurality of vertically spaced apart trays each having a plurality of perforations formed therein, and each tray being slidably removably supported within the cabinet in a non-vertical orientation to enable sliding removal for cleaning. The method may further include simultaneously forcing a clean air flow in an upward direction from a lower area of the cabinet through each one of the trays while the contaminant-entrained fluid is flowing in a downward direction over the trays, to remove the contaminants from the contaminant-entrained fluid and produce a clean fluid. The method may further involve draining the clean fluid from the lower area of the cabinet and collecting contaminant-entrained air from an upper area of the cabinet.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
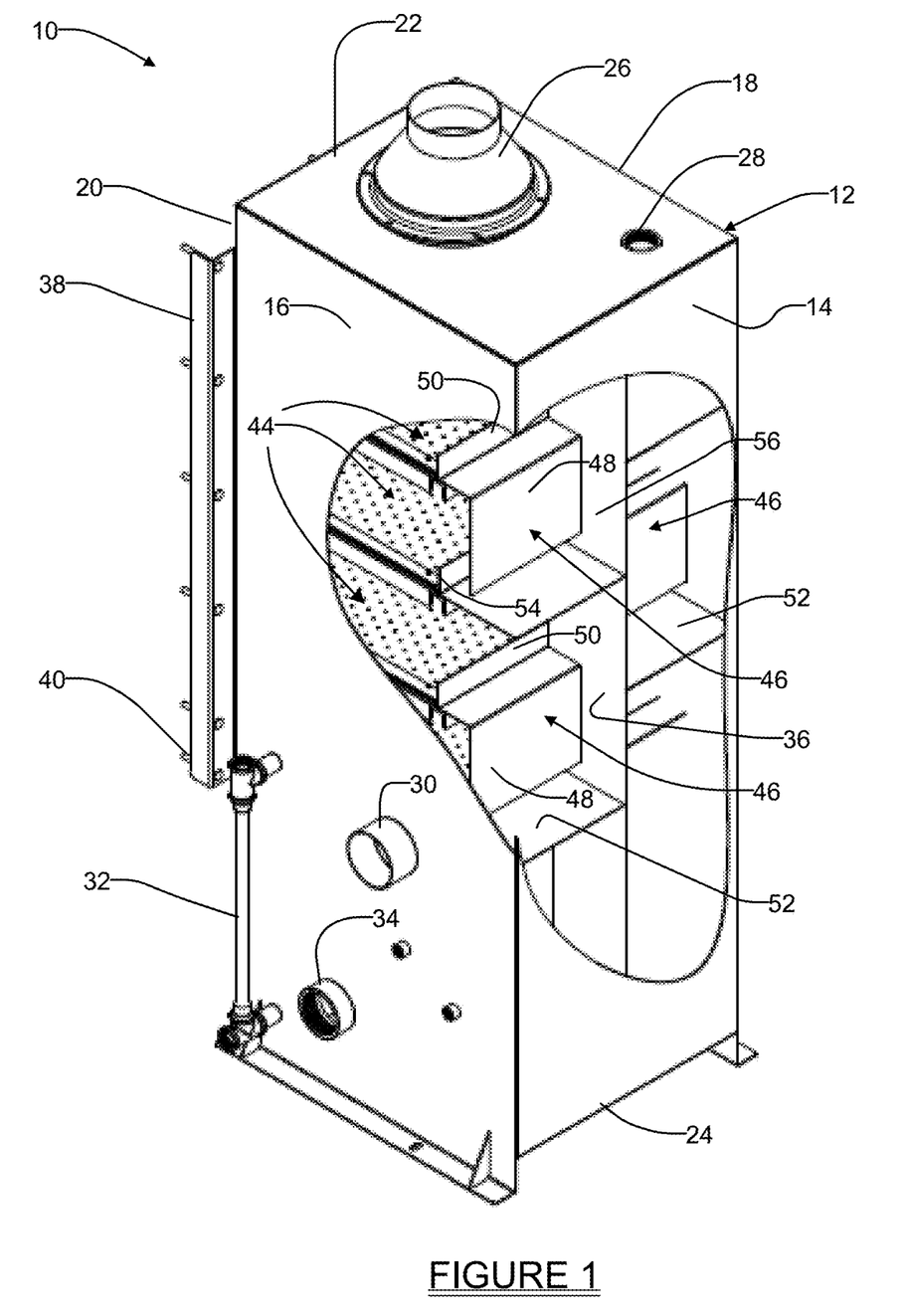
FIG. 1 is a rear perspective view of an air stripper apparatus in accordance with one embodiment of the present disclosure, with portions of a cabinet of the apparatus cut-away to reveal the construction of the built-in downcomers used in the apparatus.
Figure 2:
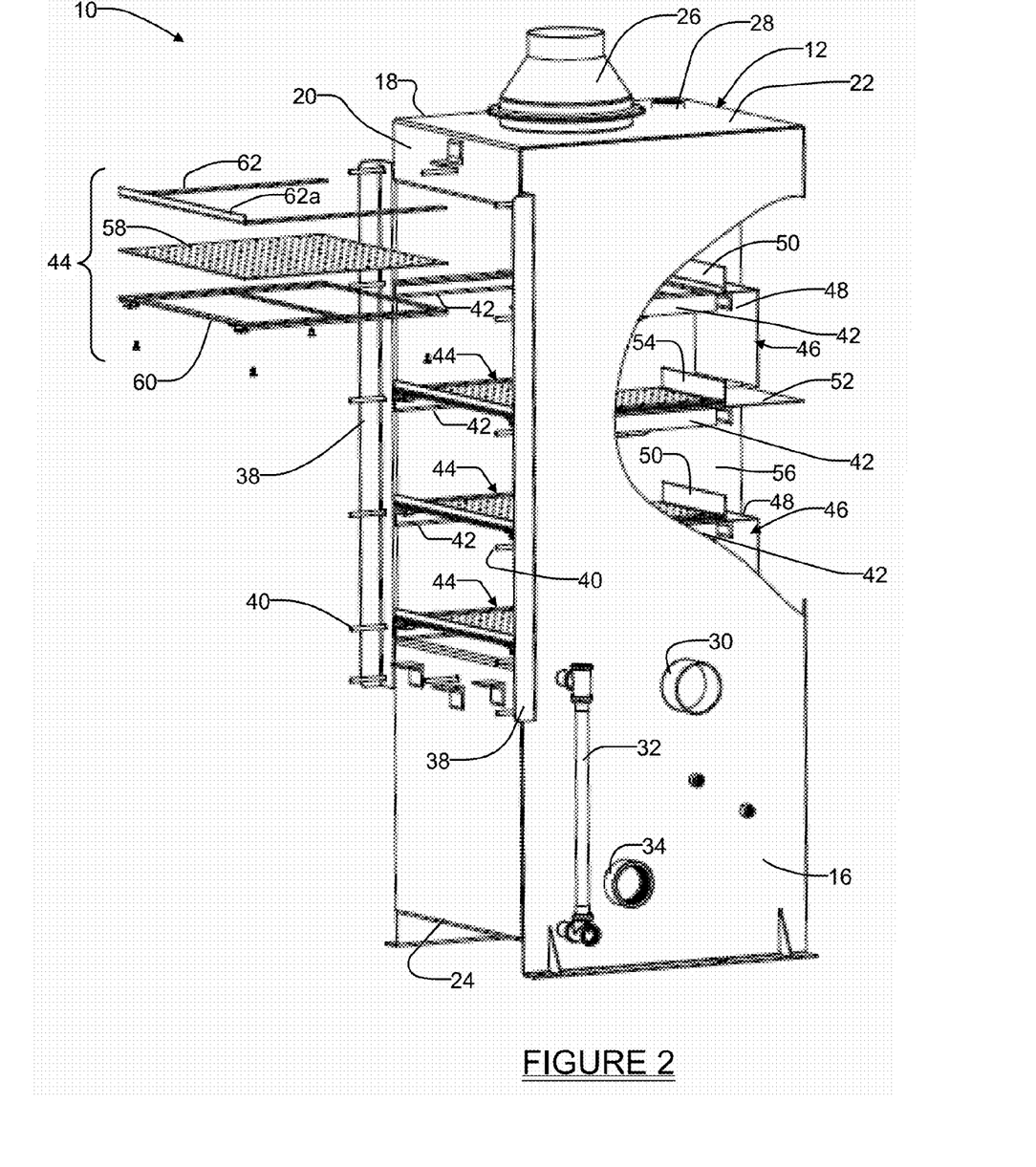
FIG. 2 is a side perspective view of the apparatus of FIG. 1 showing one of the trays of the apparatus in exploded fashion, and removed from the cabinet of the apparatus.
Figure 3:
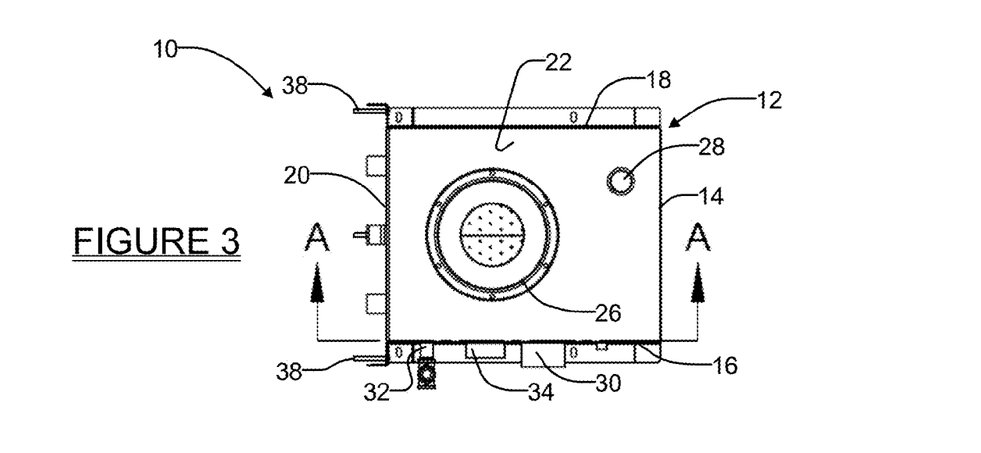
FIG. 3 is a top plan view of the apparatus.

Referring to FIGS. 1-3, there is shown an air stripper apparatus 10 in accordance with one embodiment of the present disclosure. The apparatus 10 is used for removing contaminants, for example volatile organic compounds ("VOCs") or other dissolvable gasses such as CO2, CH4, Radon, H2S, entrained, etc., entrained in fluids such as water. And while the following discussion will reference the removal of VOCs from water, it will be appreciated that the apparatus 10 may be used to remove VOCs or any other dissolvable gas, such as one or more of those mentioned above, from virtually any liquid that can be flowed through the apparatus.

The apparatus 10 includes a cabinet 12 having a rear wall 14, sidewalls 16 and 18, a front wall 20, a top wall 22 and a bottom wall 24. The top wall 22 includes an air/VOC discharge port 26 and a fluid inlet port 28. A clean air inlet port 30 is disposed on the sidewall 16. A fluid level indication standpipe 32 is also attached to the sidewall 16 for providing an indication of a fluid level within the apparatus 10. A clean water discharge port 34 allows clean water that has passed through the apparatus 10 and which has had VOCs removed therefrom to be drained from a lower interior area 36 of the cabinet 12 (best visible in FIG. 1). Elongated engagement member 38 having studs 40 enables attachment of a door (not shown) to the front wall 20 of the cabinet 12. When attached, the door makes a watertight seal with the front wall 20 to ensure that all contaminated water entering the cabinet 12 through the fluid inlet port 28 remains within the cabinet until being drained through the clean water discharge port 34.

The cabinet 12 further includes a plurality of tray support members 42 for supporting a plurality of trays 44. Each tray 44 is supported along opposite sides in a non-vertical orientation, and in one specific implementation in a horizontal orientation, by a pair of the tray support members 42. The tray support members 42 enable each tray 44 to be slidably removed and inserted on the tray support members 42 out from, or into, the cabinet 12 after the door (not shown) is removed from the cabinet 12. The trays 44 may be perforated to allow clean air to be forced upwardly through VOC contaminated fluid which collects on each tray as the fluid flows through the cabinet 12. In this example, the trays 44 are all identical in construction and will be described in greater detail in the following paragraphs. However, in an optional embodiment the trays 44 need not necessarily be perfectly identical in construction. For example, in one embodiment it the upper positioned tray(s) may feature larger sieve holes than one or more of the lower positioned trays. This may help to prevent fouling of the upper tray(s) and may help to extend run time between cleanings if fouling is more pronounced on the upper trays, which is often the case.

Figure 4:
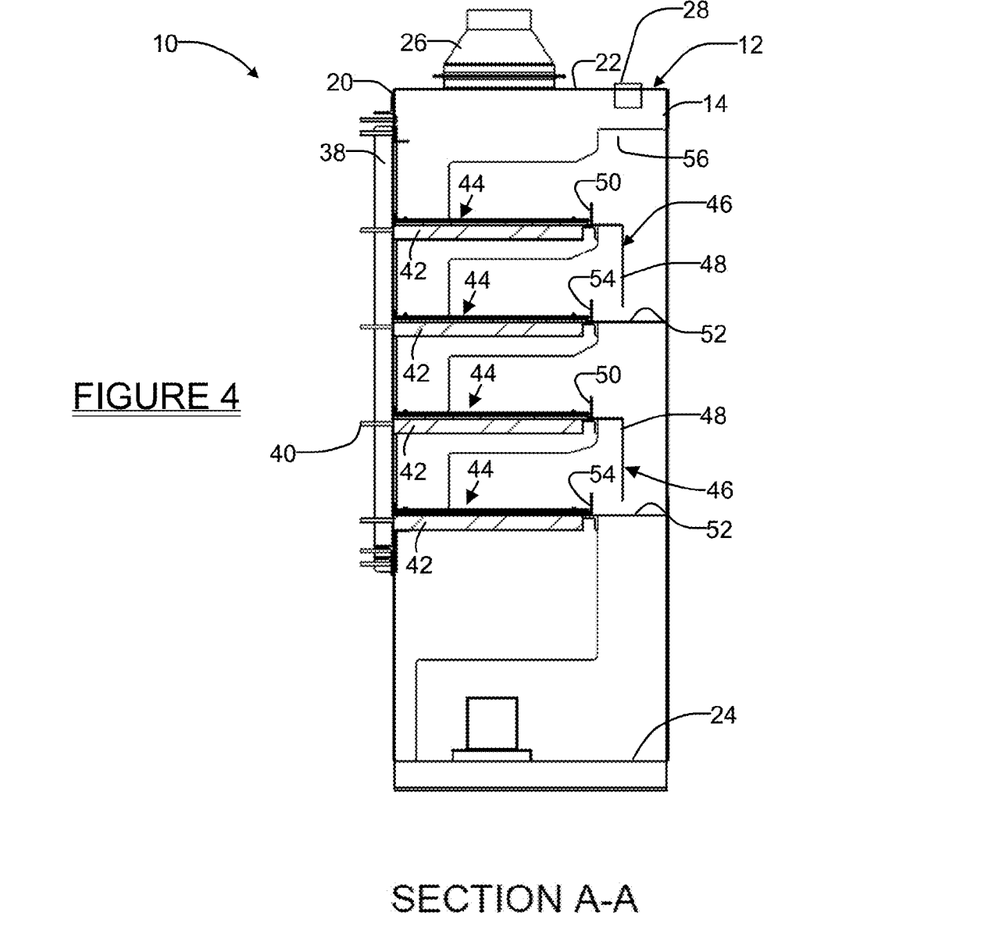
FIG. 4 is a cross sectional side view taken in accordance with section line A-A in FIG. 3 better showing the vertical spacing of the horizontally oriented trays.
Figures 5, 6:
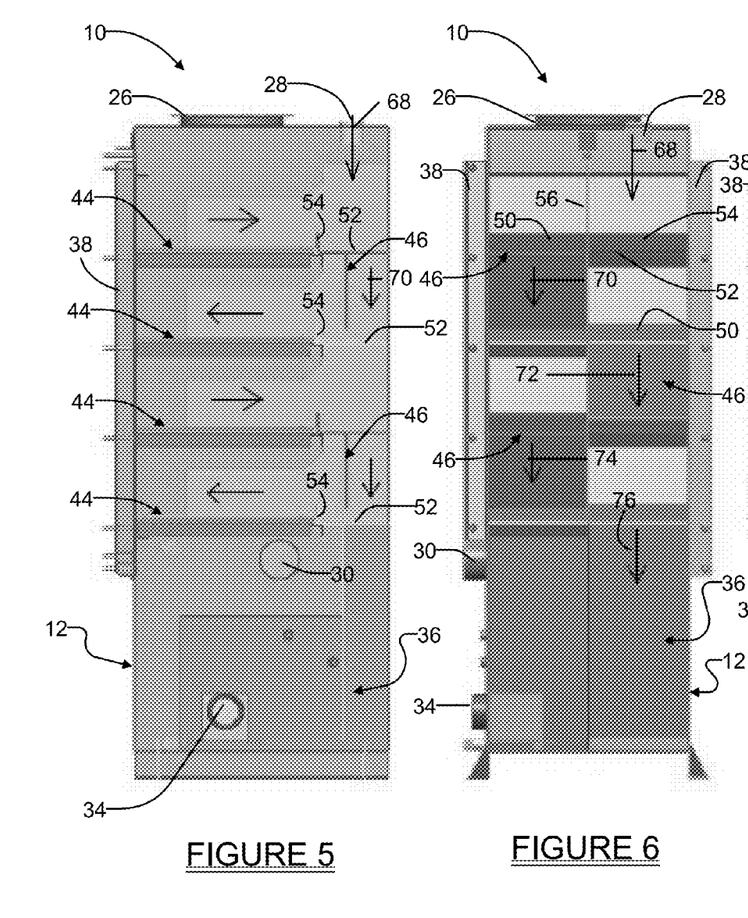
FIG. 5 is simplified side cross sectional view showing a flow of fluid through the apparatus, as indicated by the arrows.
FIG. 6 is a simplified rear cross sectional view of the apparatus illustrating the flow of a fluid through the cabinet, as indicated by the arrows.
Figure 7:
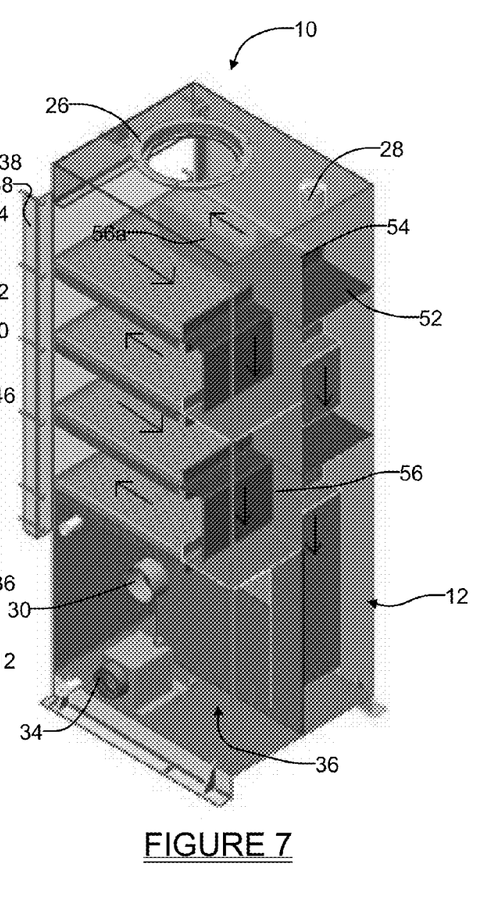
FIG. 7 is a simplified perspective overhead view of the apparatus further illustrating the flow of contaminant-entrained fluid through the cabinet, as indicated by the arrows.

Referring further to FIGS. 1 and 4, the cabinet 12 includes a plurality of downcomers 46 which collectively form a fixed internal portion of the cabinet 12. By "fixed" it is meant that the downcomers 46 are not intended to be removable from the cabinet 12 by a user. The downcomers 46 are each formed by an inverted J-shaped panel 48 and each includes a weir 50. The downcomers 46 are arranged in two vertical, side-by-side columns, and are elevationally staggered as best shown in FIGS. 1 and 6. A horizontally arranged plate 52 with a weir 54 is placed vertically between successive downcomers 46 as shown in FIGS. 1, 4 and 6. Each inverted J-shaped panel 48 extends down slightly below an upper edge of its associated weir 54. This ensures that when water is flowing down over the downcomer 46, a lower edge of the inverted J-shaped panel 48 will be below the water level defined by the upper edge of the weir 54, and as such there will be no possibility of air escaping upwardly between weir 54 and the inverted J-shaped panel 48. The downcomer 46 thus forms an air seal when full of water.

As can also be seen in FIGS. 1, 4 and 6, a vertically arranged central wall 56 is disposed along an internal midpoint of the cabinet 12. The central wall 56 does not extend to the front wall 20 but rather ends short of the front wall 20, and thus acts to help channel the flow of water downwardly in a serpentine path through the cabinet 12, as will be explained in greater detail in the following paragraphs.

Figure 8:
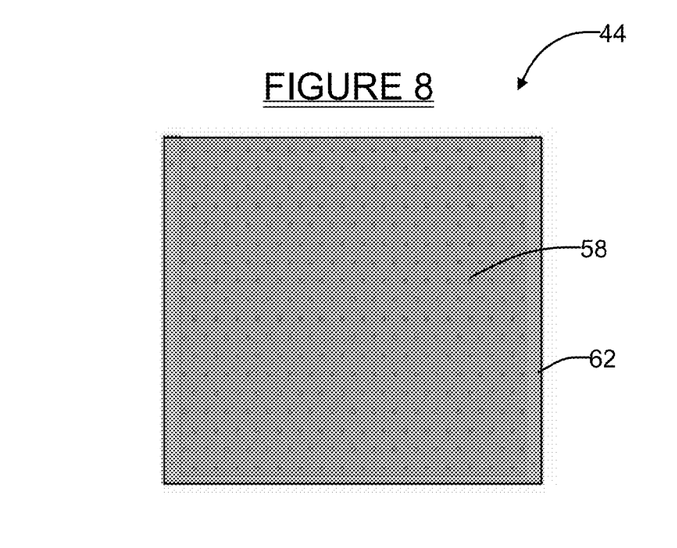
FIG. 8 is a plan view of one tray of the apparatus.
Figure 9:
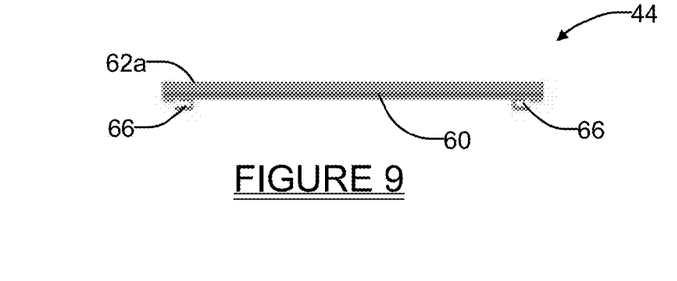
FIG. 9 is an front end view of the tray of FIG. 8.
Figure 10:
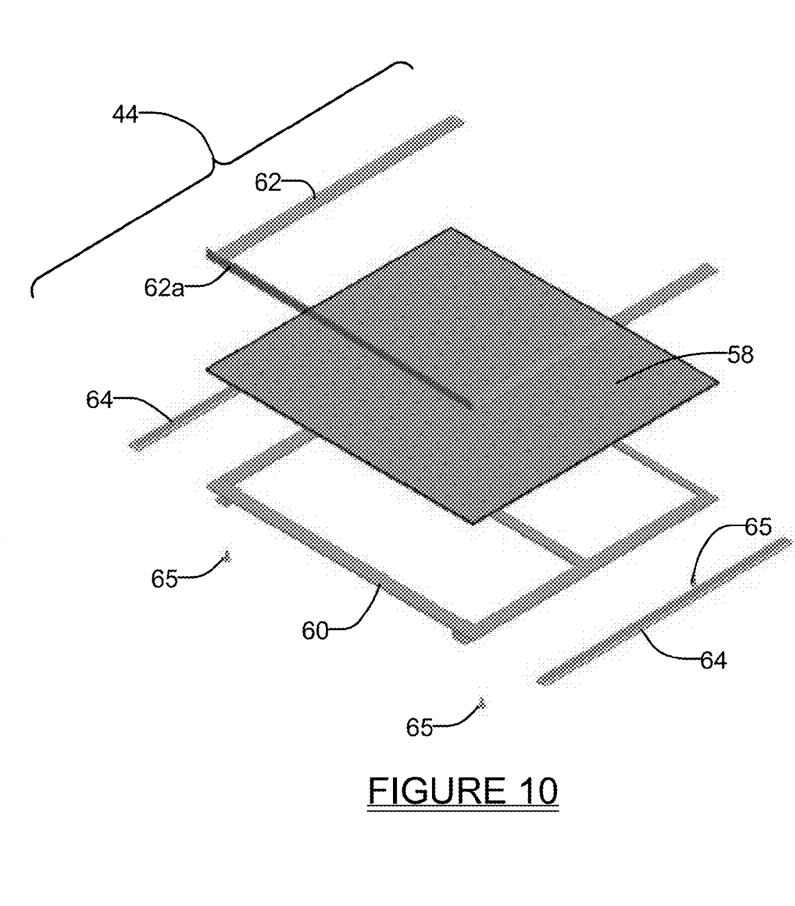
FIG. 10 is an exploded perspective view of the tray of FIG. 8 showing the individual component parts of the tray.

With reference to FIGS. 8-10, the tray 44 and its construction can be seen in greater detail. As seen in FIG. 10, the tray 44 includes a perforated sheet 58 which allows air to be blown upwardly therethrough from a lower portion of the cabinet 12. The perforated sheet 58 may be made from stainless steel, plastic, or any other suitable material. The perforations may vary in diameter but typically have a diameter of between about 0.125 inch-0.25 inch. Periodic cleaning of the perforated sheet 58 is required to prevent the perforations from becoming plugged. Plugging of the perforated sheet 58 may result in reduction of air flow due to increased back pressure on the air mover (not shown) supplying clean air to the apparatus 10.

The perforated sheet 58 is sandwiched about its edges by a lower frame component 60 and an upper frame component 62. A pair of elongated felt strips 64 are applied to the bottom of lower frame component 60. The felt strips 64 act as air seals when they become wet; that is, they seal but are also able to slide when the tray 44 is removed. Fasteners 65, which may be threaded fasteners or virtually any other type of suitable fastener (e.g., pop-up plastic trim fasteners) are used to secure the components 60, 62 and 64 in a manner so that the perforated sheet 58 is clamped between the components 62 and 64 and forms a relatively rigid assembly. In FIG. 9, the lower frame component 60 can be seen to include a pair of oppositely arranged, U-shaped elements 66 which help to facilitate engagement with the tray support members 42 and enable the tray 44 to be easily slid into and out of the cabinet 12 when the cabinet door (not shown) is removed. When the trays 44 are installed they form a generally watertight seal between the inside surfaces of the cabinet sidewalls 16 and 18, the front wall 20, and with the weirs 50 and 54.

Referring to FIGS. 1 and 5-7, VOCs are removed from VOC contaminated water as the contaminated water is fed into the fluid inlet port 28. This occurs as pressurized clean air, which is blown in through the clean air inlet port 30, flows upwardly through the perforations of perforated sheet 58 of each tray 44. VOC contaminated water initially drains through the fluid inlet port 28 as indicated by arrow 68 in FIGS. 5 and 6. The VOC contaminated water collects on the horizontally arranged plate 52 until it reaches the upper edge of the vertically arranged weir 54 at the upper right of the cabinet (FIG. 6), and then begins to flow over the upper edge of the weir 54 onto the uppermost tray 44. The VOC contaminated water flows around an upper portion 56a of the internal central wall 56 (FIG. 7) and collects on the uppermost tray 44 while pressurized air is being blown upwardly through perforations in the uppermost tray. When the water level reaches the upper edge of the weir 50 of the uppermost downcomer 46 (upper left in FIG. 6), the water flows over the upper edge of the weir 50, over the uppermost downcomer 46 as indicated by arrow 70 in FIGS. 5 and 6, and down onto horizontally arranged plate 52 immediately below the uppermost downcomer 46. The VOC contaminated water then begins to collect on the horizontally arranged plate 52 until it flows over the upper edge of its associated weir 54 and begins filling the second uppermost tray 44. When the VOC contaminated water reaches the level of the upper edge of the weir 50, the water flows over the weir 50 as indicated by arrow 72 in FIG. 6. This operation repeats as the VOC contaminated water flows in a serpentine path over the remaining trays 44, as indicated by arrows 74 and 76 in FIG. 6. Each tray 44 thus represents a cleaning "stage" within the apparatus 10. The VOC contaminated water becomes progressively cleaner as it passes downward through successive tray 44 stages toward the clean-well collection sump.

It will be understood that the number of stages provided within the apparatus 10 can vary significantly, and the apparatus 10 is not limited to any particular number of stages. Moreover, two or more of the apparatuses 10 could be configured in series so that the water exiting a clean water discharge port of the first one of the apparatuses 10 is then fed immediately into a fluid inlet port of the a second one of the apparatuses 10. Thus, if each one of the apparatuses 10 has six independent stages, the resulting series combination would effectively provide a twelve stage air stripper system.

When the water reaches the bottom of the cabinet 12 it is essentially free of VOCs and collects in the lower interior area 36. The lower interior area 36 forms a reservoir for holding the clean water until it reaches the level of the clean water discharge port 34, at which point the clean water flows out through the clean water discharge port 34. VOC laden air is discharged upwardly through the air/VOC discharge port 26 and is either discharged to the atmosphere or routed to a secondary air treatment process unit (such as vapor phase granular activated carbon or catalytic oxidation) (not shown).

It is a principal feature of the apparatus 10 that the downcomers 46 are fixedly disposed in the cabinet 12 and do not form a part of each tray 44. This significantly simplifies construction of the trays 44, in addition to making the trays lighter and easier to handle during removal, insertion and cleaning. Eliminating the downcomers 46 from the trays 44 also eliminates the need for gaskets that would otherwise be required to form a seal between the downcomer and an opening in the tray through which the downcomer would typically be positioned. As such, the risk of any internal water leak paths developing in the areas adjacent to the downcomers 46, within the cabinet 12, is significantly reduced. Eliminating the downcomers 46 from the trays 44 also enables a given tray to be replaced or repaired more cost effectively than would be the case if the downcomer structure was fixedly secured to the tray. Spare trays 44 can also be stacked easily and soaked in cleaning tanks in a more compact configuration.

Referring to FIGS. 11-14, an air stripper apparatus 100 is shown in accordance with another embodiment of the present disclosure. The air stripper apparatus 100 (hereinafter simply "apparatus 100") may include a cabinet 102 having a rear wall 104, vertical sidewalls 106 and 108, a front wall 110, a top wall 112 and a bottom wall 114. The sidewall 106 may include a clean air inlet port 120, a fluid level indication stand pipe 122 and a clean water discharge port 124. An elongated engagement member 126 having studs 128 enables a door to be attached to the front wall 110. The top wall 112 may include a fluid inlet port 130 and a contaminated air discharge port 132 which routes contaminated air to a suitable off-gas treatment process or to the ambient atmosphere if gas treatment is not required.

Figure 11:
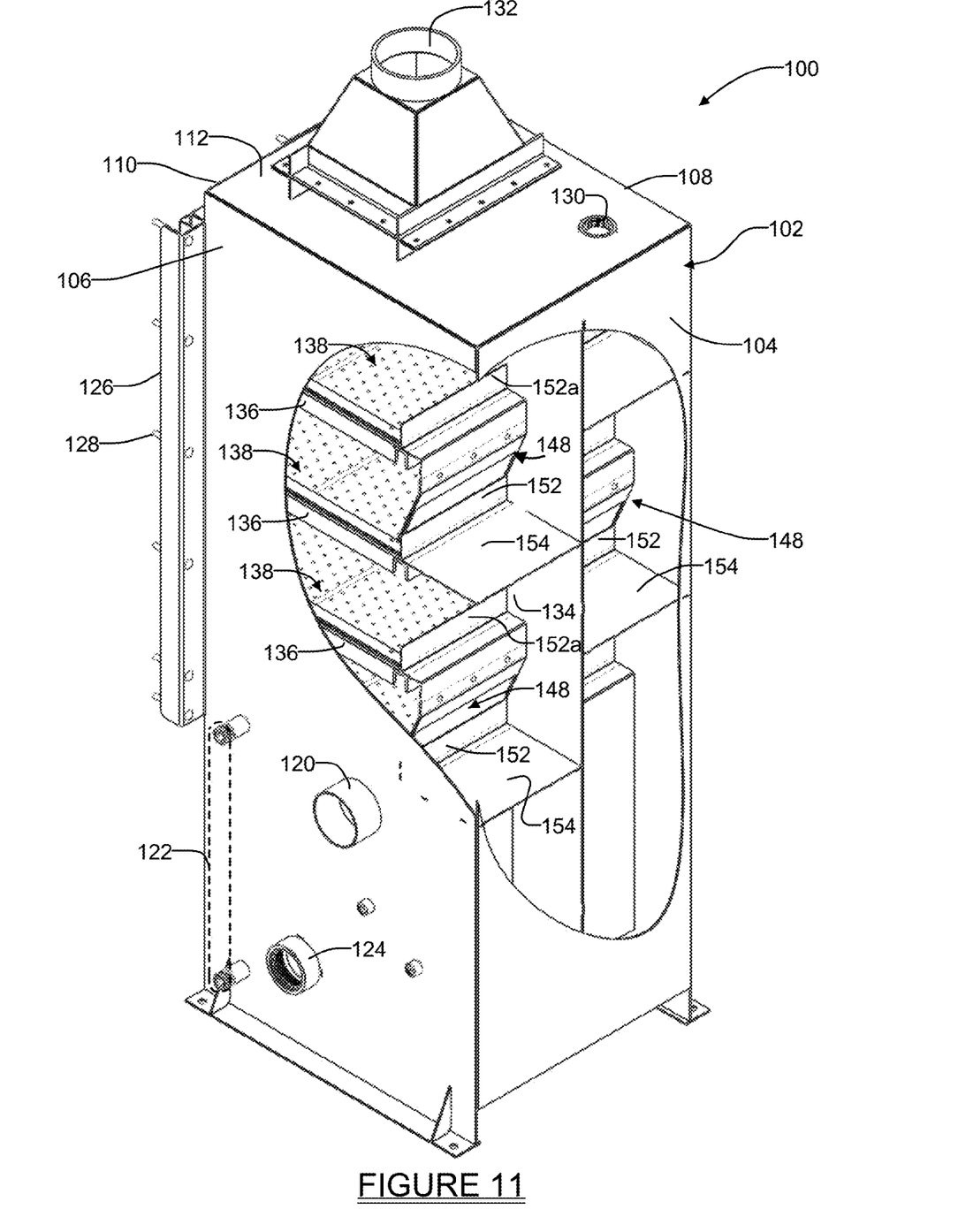
FIG. 11 is a rear perspective, partial cutaway view of another embodiment of an air stripper apparatus in accordance with the present disclosure.
Figure 12:
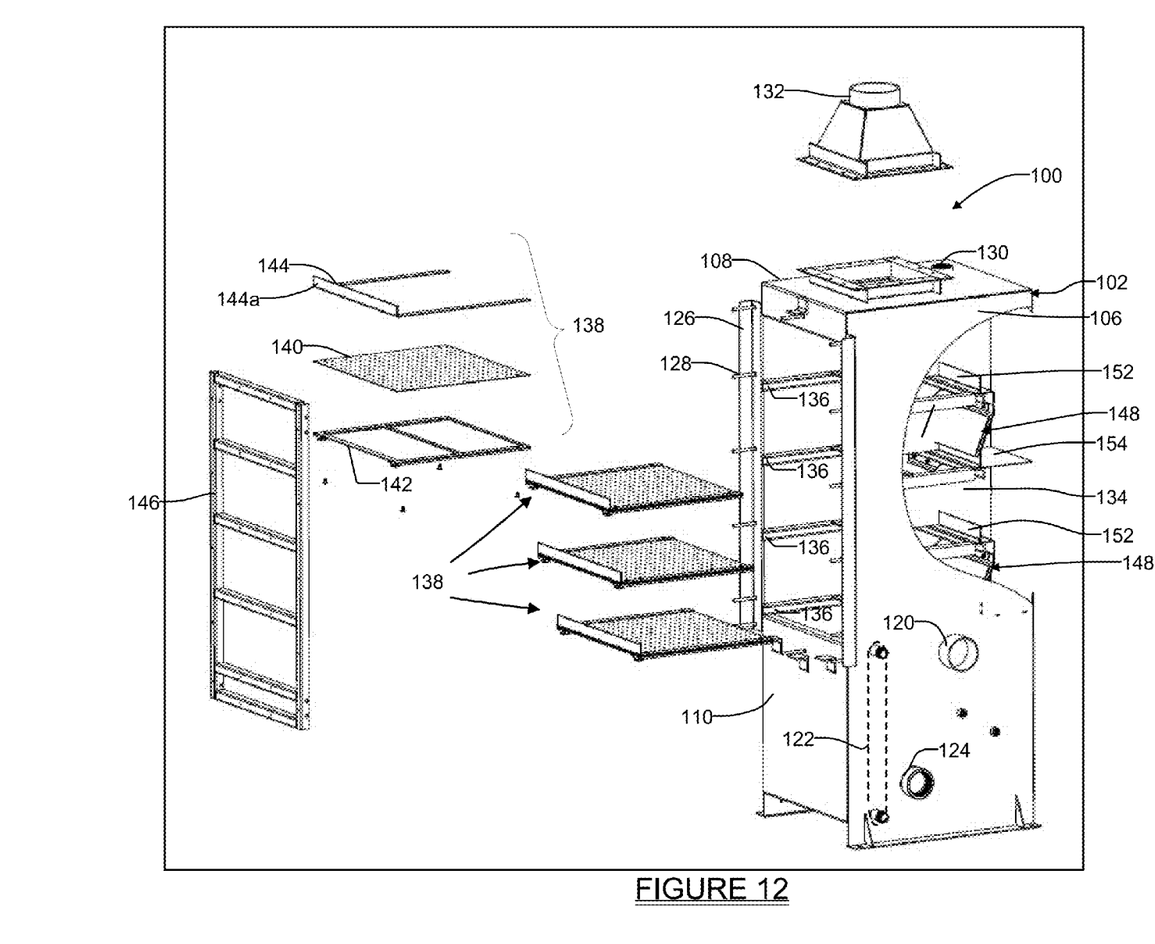
FIG. 12 is an exploded perspective view of the apparatus of FIG. 11 showing various components of the apparatus removed therefrom to better illustrate various ones of the components.

Referring to FIGS. 11 and 12, internally the apparatus 100 is somewhat similar to the apparatus 10 in that it includes a central vertical wall 134 which helps to partition the interior area of the cabinet 102 into two side-by-side vertical, rectangular compartments. Tray support members 136 support removable trays 138 arranged vertically one above one another. Each tray 138 may be the same as tray 44 or may differ slightly in construction. In this example, the trays 138 are shown constructed identically to trays 44 with a perforated sheet 140 supported by a lower frame component 142 and an upper frame component 144. Frame 146 may be secured to the cabinet 102 to help support a forward edge of each tray 138. Upper frame component 144 may include a flange 144a to aid in grasping the tray 138 during removal from, and reinsertion into, the cabinet 102. The tray support members 136 hold the trays 138 in a non-vertical orientation, and in one embodiment in a horizontal orientation.

As shown particularly well in FIGS. 11-13 and 15, a significant difference between the apparatus 100 and the apparatus 10 is the use of hingedly supported and pivotally movable downcomers 148. Each Downcomer 148 has a lower edge 150 that contacts a weir 152. Each weir 152 forms an upstanding wall that may be a portion of one of the downcomers 148, as will be explained further in the following paragraphs, or it may be a fully separate component. Weirs 152a are separate components that are not associated with a downcomer 148. Horizontal floor sections 154 are positioned adjacent to each weir 152 or 152a and form a floor on which fluid may collect until the fluid level rises to a point of flowing over the weir 152 or 152a.

Figure 15:
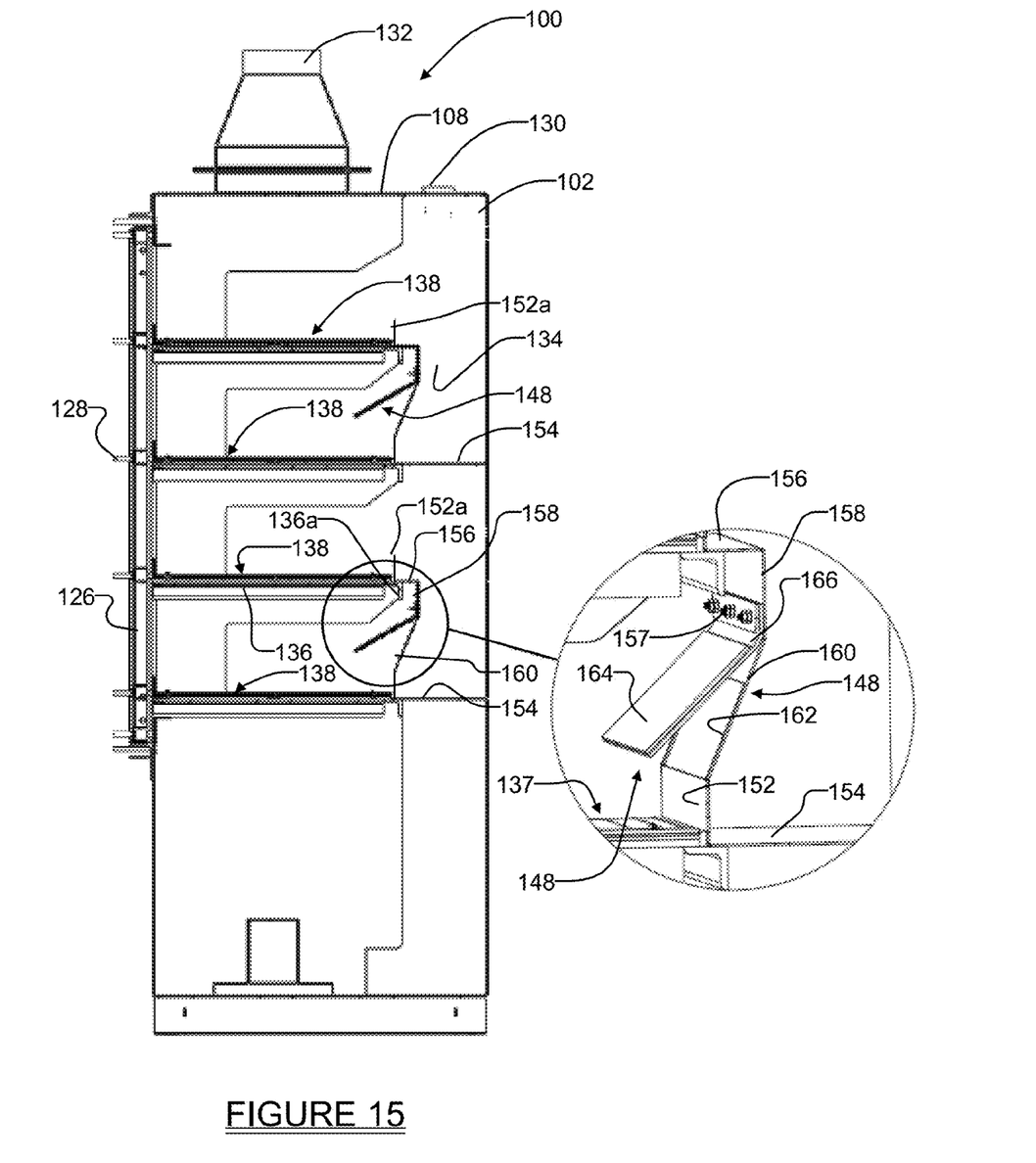
FIG. 15 is a side view of the apparatus of FIG. 11 with a sidewall removed to better show internal components, and an enlarged portion showing one example of a construction for the pivotally movable downcomers used in the apparatus.

FIG. 15 shows one of the downcomers 148 in greater detail in its enlarged circle graph portion. In this example the downcomer 148 may include a horizontal section 156 secured to and a rear edge 136a of its associated tray support member 136, such as threaded fasteners 157 or any other suitable means of attachment. The horizontal section 156 transitions to a depending leg 158, which transitions to a frame portion 160. The frame portion 160 may have a cutout section 162 of dimensions just slightly smaller than the outer dimensions of a non-flexible panel 164. The panel 164 may be secured such as by adhesives or any other suitable means to a flexible member 166, for example a length of rubber or elastomeric material. The flexible member 166 allows a degree of pivoting movement of the downcomer 148 while the frame portion 160 prevents the panel 164 from being blown past the weir 152. In this example the weir 152 forms an extension of the frame portion 160, but the weir 152 may just as readily be constructed as an independent component. In this regard it will be appreciated that on alternating sides of each tray 138, one side will not have a downcomer 148, and the weirs 152a on those sides without downcomers 148 will be independent components. Alternatively, the weirs 152a may each be formed as a portion of its adjacent the floor section 154. It is also an option that the frame portion 160 be eliminated and the length of the panel made sufficiently long so that it hangs down slightly below the upper edge of its associated weir 152 when in the closed position, which would also prevent the panel 164 from being blown past the weir toward the rear wall 104 of the cabinet 102.

Figure 13:
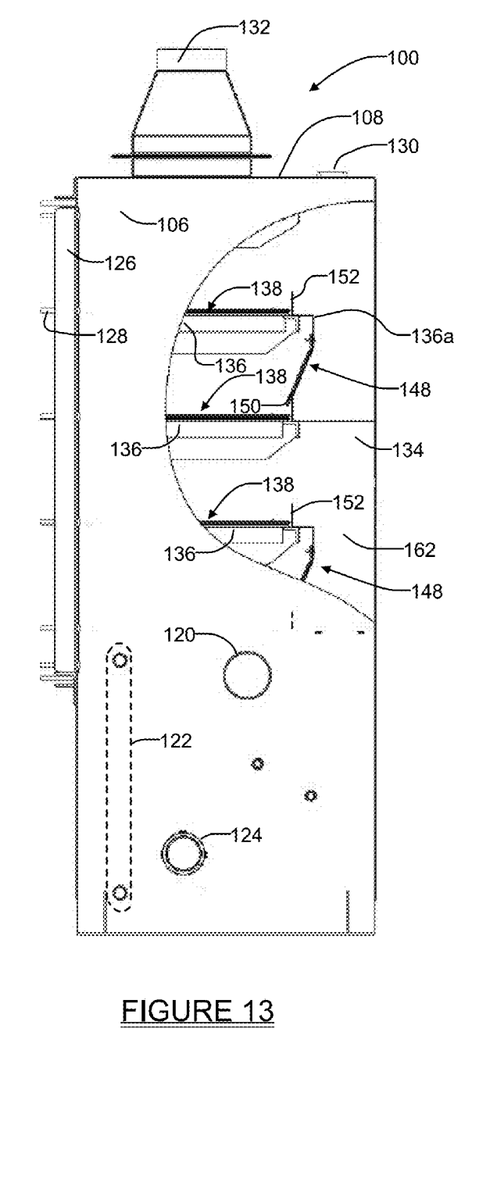
FIG. 13 is a side, partial cutaway, view of the apparatus of FIG. 11.
Figure 14:
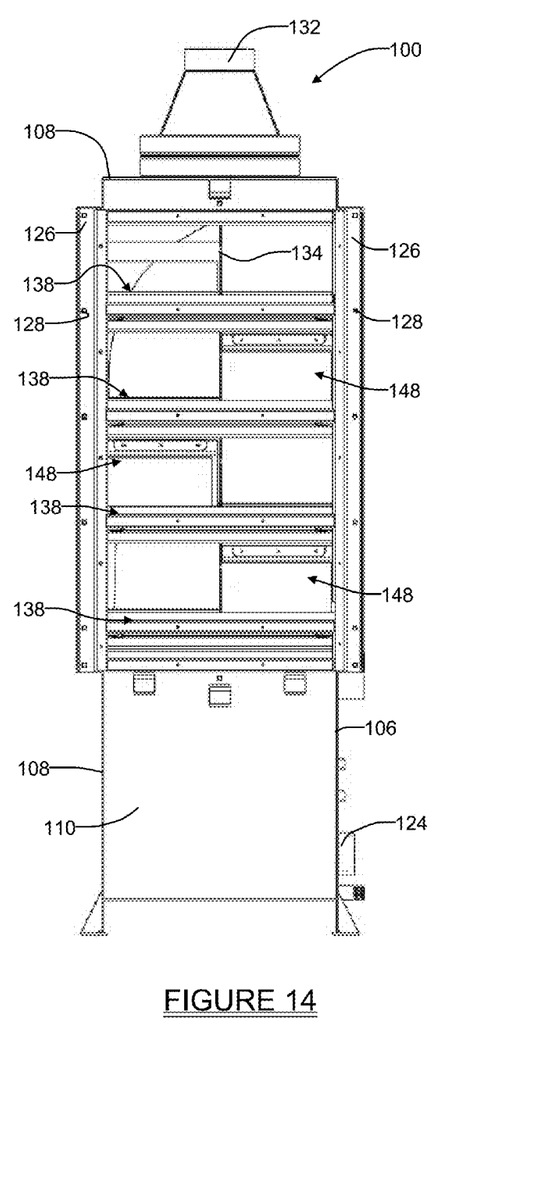
FIG. 14 is a front view of the apparatus of FIG. 11 with a door removed to expose various internal components.

The ability of each downcomer 148 to move pivotally from a position resting against the upper edge of its respective weir 152, provides a significant benefit it that it seals the gap between the downcomer 148 and the weir 152 to prevent air flow flowing up between the downcomer and its weir when the apparatus 100 is first started for use, and the fluid level on the trays 138 has not risen to crest over the weirs 152 and provide an air seal at this location. The downcomers 148 thus each act as a seal to prevent air flowing upwardly through the lowermost trays 138 from bypassing upper ones of the trays and being diverted over the weirs 152. When in their closed positions, as shown in FIG. 13, each downcomer 148 seals the air flow path between its lower edge 150 and an upper edge of its respective weir 152, to prevent airflow laterally towards a rear area 162 (FIG. 13) of the cabinet 102. But as each of the uppermost trays 138 fill with VOC-contaminated fluid and overflow the uppermost weirs 152, the VOC-contaminated fluid flows down along the downcomers 148 and eventually collects on floor sections 154, until the fluid level rises to an upper edge of the weir 152 and then pushes the downcomer panel 164 toward the front wall 110 of the cabinet. This allows the fluid to then flow onto the adjacent tray 138. The fluid flow through the cabinet 102 is identical to that described for the apparatus 10.

When VOC-contaminated fluid drains through any given one of the trays and drops below the level of its associated weir 152, the downcomer will automatically move back into a sealing position against its respective weir 152 by the force of gravity. Thus, if the fluid supply to the cabinet 102 is shut off, and the apparatus 100 is shut down, when the apparatus 100 is restarted and fluid is again supplied into the fluid inlet port 130, all of the downcomers 152 will be in their sealed positions. This will prevent airflow up through the trays 138 until the fluid level on each horizontal floor section 154 forces its associated downcomer 148 open.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An air stripper apparatus comprising:
   a cabinet having a fluid inlet port for admitting a contaminant-entrained fluid, a clean fluid discharge port adjacent a lower area of the cabinet, a clean air inlet port, and a contaminant-entrained air discharge port adjacent an upper end of the cabinet;
   a plurality of trays removably supported within the cabinet in a horizontal orientation;
   a plurality of tray support members for supporting the trays removably within the cabinet;
   a plurality of floor sections disposed fixedly within the cabinet and respectively adjacent the plurality of trays;
   a central vertical wall which divides the cabinet into two vertically arranged sections;
   each of the trays having a plurality of perforations for allowing air to be blown in an upward direction through each tray and through the contaminant-entrained fluid collecting on each tray, wherein the air flowing through the contaminant-entrained fluid residing on each tray removes and entrains contaminants therein from the contaminant-entrained fluid;
   a plurality of downcomers disposed within the cabinet and respectively adjacent the plurality of floor sections for helping to control a flow of the contaminant-entrained fluid through the cabinet; and
   a plurality of weirs located respectively adjacent the plurality of downcomers and operable to help the contaminant-entrained fluid collect on the trays;
   wherein each of the downcomers is pivotally movable in a first direction away from the associated weir in response to a rising level of the contaminant-entrained fluid on the associated floor section, and in second direction into contact with the associated weir to block air flow between the associated weir and the downcomer.

2. The apparatus of claim 1, wherein each of the downcomers includes a flexible section of material and a non-flexible panel secured to the flexible section of material.

3. The apparatus of claim 2, wherein each of the downcomers further includes a frame portion with an opening smaller than dimensions of the non-flexible panel.

4. The apparatus of claim 1, wherein each of the trays comprises:
- a lower frame section;
- a perforated sheet configured to rest on the lower frame section; and
- an upper frame component configured to help secure the perforated sheet against the lower frame section.

5. The apparatus of claim 1, wherein the cabinet further comprises:
- a top wall;
- the contaminant-entrained air discharge port disposed on the top wall;
- the fluid inlet port being disposed on the top wall;
- a pair of sidewalls;
- a rear wall; and
- the clean fluid discharge port being disposed on one of the sidewalls.

6. The apparatus of claim 1, wherein:
- the two vertically arranged sections are side by side sections;
- the plurality of trays are arranged vertically within the cabinet in the side by side sections so as to be staggered vertically from one another; and
- the plurality of tray support members are adapted to support each said tray slidably.

7. A method for performing an air stripping operation to remove contaminants from a contaminant-entrained fluid by using the apparatus of claim 1, the method comprising:
- using the cabinet to receive a contaminant-entrained fluid through the fluid inlet at an upper end thereof;
- flowing the contaminant-entrained fluid through a plurality of horizontally oriented and vertically spaced apart trays each having a plurality of perforations formed therein, and each said tray being slidably removably supported within the cabinet in a horizontal orientation to enable sliding removal of the trays for cleaning;
- supporting the trays on the tray supports adapted to allow the trays to be slidably removed from the cabinet;
- simultaneously forcing a clean air flow from the clean air inlet port in an upward direction from a lower area of the cabinet through each one of the trays while the contaminant-entrained fluid is flowing in a downward direction over the trays, to remove the contaminants from the contaminant-entrained fluid and produce a clean fluid;
- using the plurality of pivotally supported downcomers adjacent each one of the trays to further help channel the clean air flow up through the trays;
- draining the clean fluid from the lower area of the cabinet; and
- collecting contaminant-entrained air from an upper area of the cabinet.

* * * * *